United States Patent [19]

Ludtke et al.

[11] 4,216,506
[45] Aug. 5, 1980

[54] CARD TRANSPORT MECHANSIM

[75] Inventors: Gerald W. Ludtke, Chicago; Glenn A. Butler, Hanover Park; George F. Krtous, Chicago, all of Ill.

[73] Assignee: Bell & Howell Company, Chicago, Ill.

[21] Appl. No.: 868,775

[22] Filed: Jan. 12, 1978

[51] Int. Cl.$^2$ .......................... G11B 15/48; G11B 5/54
[52] U.S. Cl. ...................................... 360/74.1; 360/2; 360/105
[58] Field of Search ................. 360/74.1, 84, 130, 88, 360/2, 105

[56] References Cited

U.S. PATENT DOCUMENTS

| | | | |
|---|---|---|---|
| 3,333,065 | 7/1967 | Torok | 360/105 |
| 3,472,970 | 10/1969 | Basseches | 360/105 |
| 3,602,517 | 8/1971 | Sehnal | 360/105 |
| 3,751,042 | 8/1973 | Platt | 360/105 |
| 3,756,610 | 9/1973 | Naegele et al. | 360/130 |
| 3,821,519 | 6/1974 | Pietenpol | 360/2 |
| 3,852,817 | 12/1974 | Budrose | 360/130 |
| 3,898,432 | 8/1975 | Agnew et al. | 360/2 |
| 3,946,438 | 3/1976 | Altman et al. | 360/88 |
| 4,023,205 | 5/1977 | Warner | 360/2 |
| 4,110,805 | 8/1978 | Oishi | 360/130 |
| 4,126,885 | 11/1978 | Muretz | 360/2 |

*Primary Examiner*—Vincent P. Canney
*Attorney, Agent, or Firm*—Roger M. Fitz-Gerald; Robert J. Schneider

[57] ABSTRACT

The present invention provides an improvement in a card reader type audio visual teaching device. The device employs a card handling mechanism for moving an information card which may contain both audio and visual information, across a record/playback transducing head. A dual track magnetic stripe on the information card carries instructor information or a question on one track to be audibly reproduced by the device which a student can hear through a speaker or preferably a set of headphones. A microphone permits a student to record an attempted repetition or response on the second track. The improvement comprises a multispeed card transport drive mechanism which permits either the student track or both the instructor track and the student track to be driven past the record/playback head at a substantially reduced rate. Additionally, the transport drive mechanism includes a repeat mechanism for returning the card to an initial position. A drive capstan is canted in one direction for forward movement of the card and in an opposite direction for reverse movement of the card while a pair of limit switches serve to limit the travel of the card in the respective directions. A pair of hardened and polished pins are mounted within the card guide track to substantially reduce wear and friction caused by the moving cards.

5 Claims, 6 Drawing Figures

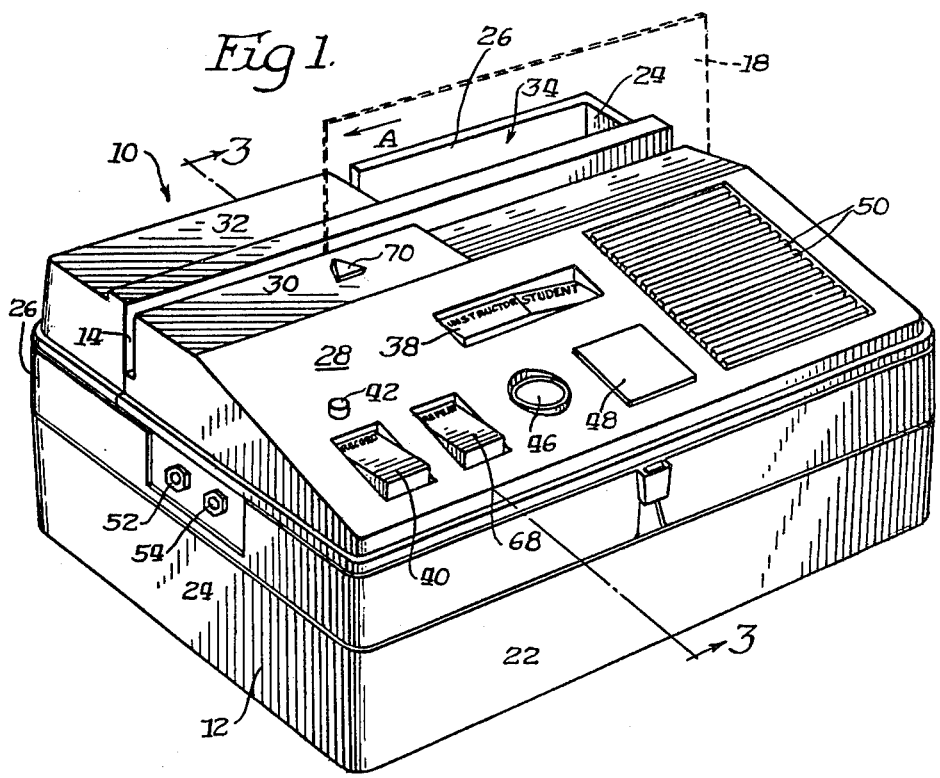
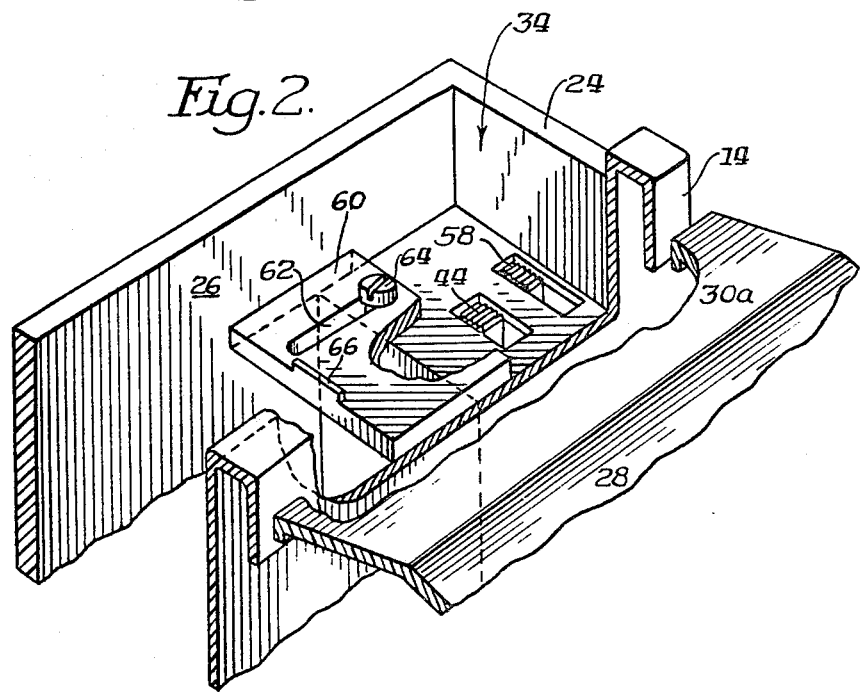

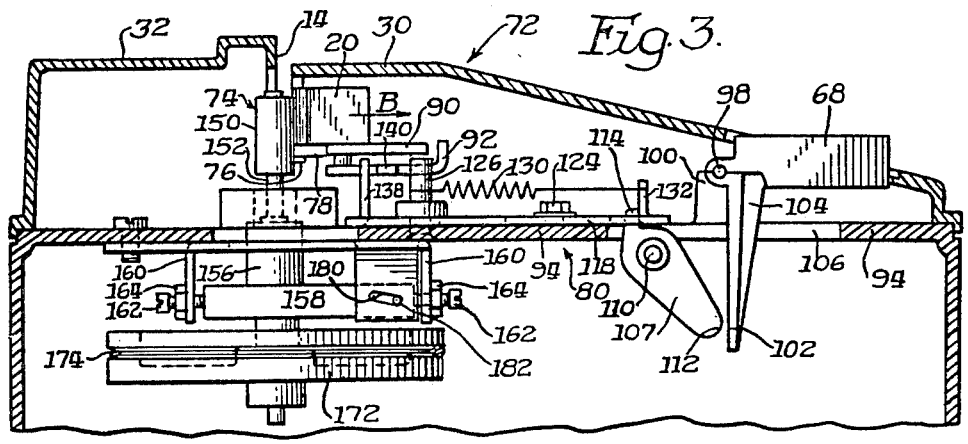
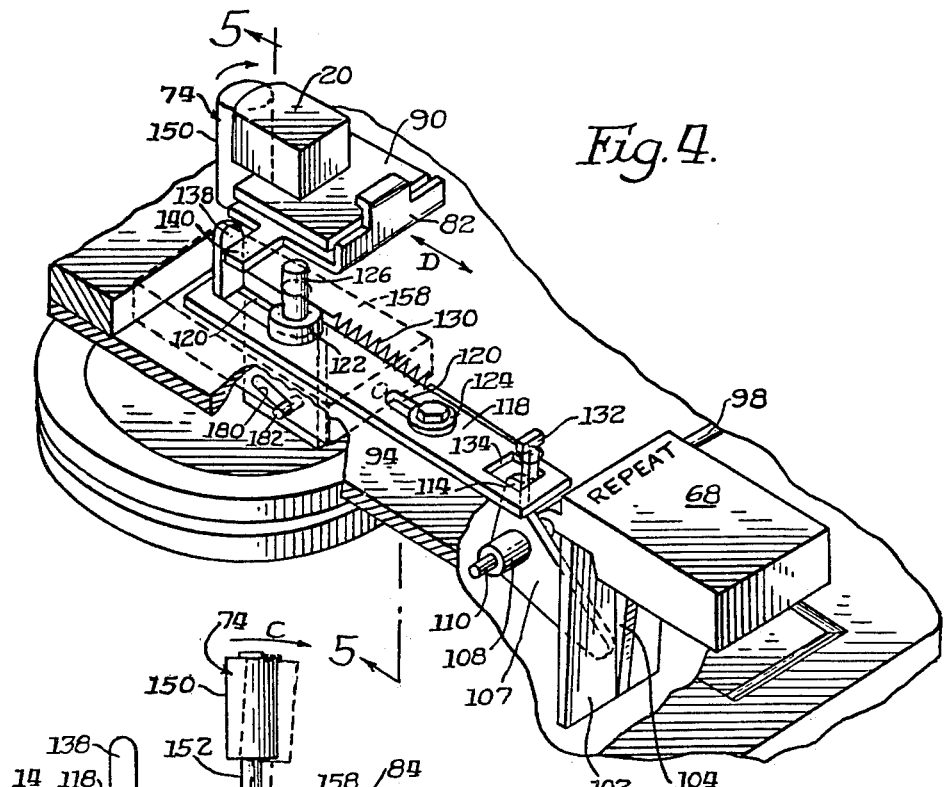
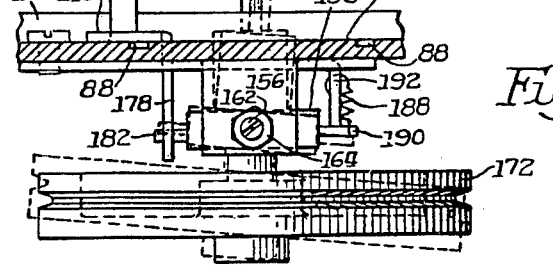

CARD TRANSPORT MECHANSIM

BACKGROUND OF THE INVENTION

1. Field of the Invention

The present invention relates to audio visual teaching devices and more particularly to an improved teaching device of the card reader type.

2. Brief Description of the Prior Art

Audio visual teaching devices employing a drive mechanism for moving an information card including a magnetic stripe through a guide channel past a transducing head are shown in U.S. Pat. Nos. 3,821,519 and 4,007,547, which are assigned to the Assignee of the present invention. Generally, such machines transport the information card past a record/playback head which reads a soundtrack containing a magnetic recording of selected instructor audio information or questions. The student then attempts to respond to the instructor information in some manner such as answering a recorded question or repeating the information, which may be useful in teaching of a foreign language or teaching the proper pronunciation of a word for building a student's vocabulary in his native language. The student's response is recorded on a second sound track for later comparison by the student or other uses, such as review by the instructor in an attempt to determine a student's progress or achievement.

It has been found that students, particularly those who are using a machine of this type for the first time or those who have a handicap such as stuttering, do not begin to attempt to repeat the instructor's information immediately when the device begins to move the card in the record mode for recording the student's response. In this case, the magnetic recording stripe on the card may be completely past the transducing head before the student has completed his attempted response to the instructor's message. Other prior art machines of this type require a separate drive mechanism for returning the information card to an initial position. Still other audio visual devices of this type have required manual removal of the card from the machine and its replacement in its starting position.

SUMMARY OF THE INVENTION

Accordingly, the primary object of the present invention is to provide a new and improved card reading type audio visual device providing a card transport mechanism which is operable in various speed modes.

Another object of the present invention is to provide a single capstan drive for moving the card in both the forward and reverse direction.

Another object of the present invention is to provide an improved card guide track which is particularly resistant to wear.

In accordance with the above and other objects, the present invention provides an improvement in an audio visual teaching device. The device employs a card handling mechanism for moving an information card which may contain both audio and visual information, across a record/playback transducing head. The audio message is recorded on a dual track magnetic stripe on the information card which carries instructor information on a first "instruction" track to be audibly reproduced by the device. The student can hear the message through a speaker or preferably a set of headphones and a microphone permits the recording of an attempted response on the second "student" track. The improvement comprises a multispeed card transport drive mechanism which permits either the student track or both the instructor track and the student track to be driven past the record/playback head at a substantially reduced rate. Additionally, the transport drive mechanism includes a repeat mechanism for returning the card to an initial position. A drive capstan is canted in one direction for forward movement of the card and in an opposite direction for reverse movement of the card while a pair of limit switches serve to limit the travel of the card in the respective directions. A pair of hardened and polished pins are mounted within the card guide track to substantially reduce wear and friction caused by the moving cards.

Other objects, features and advantages of the invention will be apparent from the following detailed description taken in connection with the accompanying drawings.

BRIEF DESCRIPTION OF THE DRAWINGS

FIG. 1 is a perspective view of a teaching device made in accordance with the concepts of the present invention;

FIG. 2 is a partially fragmented, enlarged, perspective view of the right rear corner of the device of FIG. 1;

FIG. 3 is a vertical section taken generally along line 3—3 of FIG. 1;

FIG. 4 is an enlarged, perspective view of the repeat linkage shown in FIG. 3;

FIG. 5 is a partially fragmented, vertical section, taken generally along line 5—5 of FIG. 4.

DESCRIPTION OF THE PREFERRED EMBODIMENT

Figure 6:
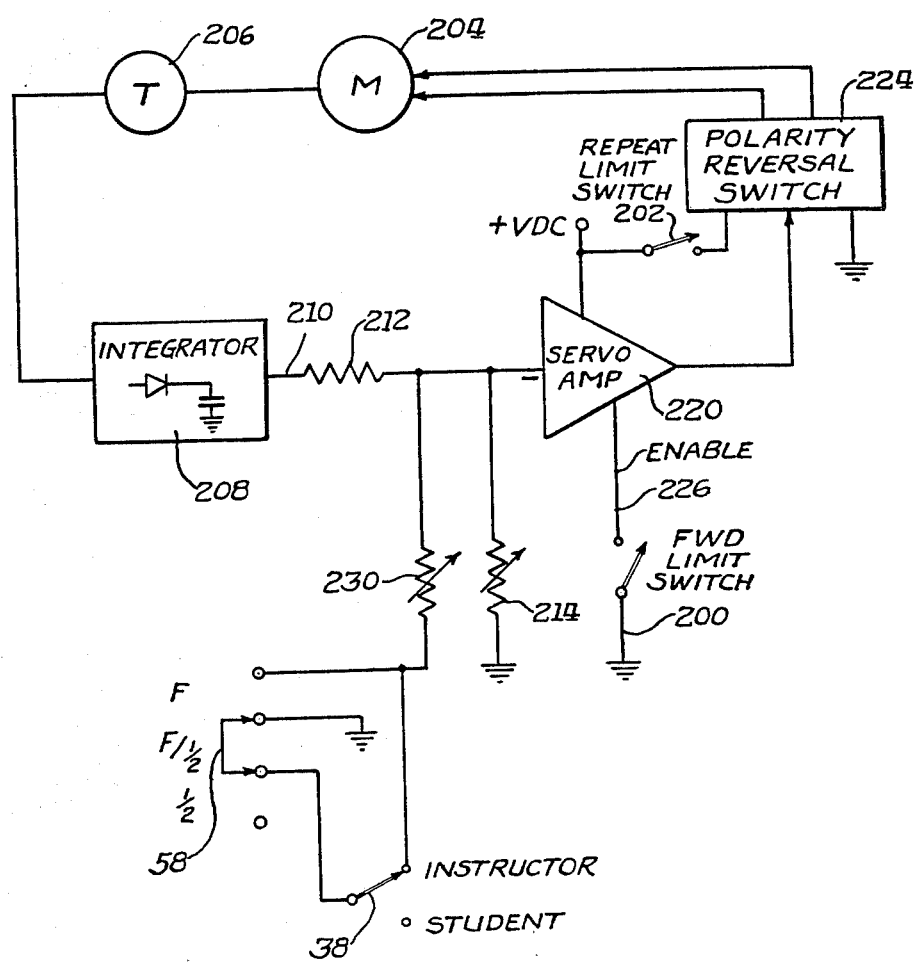
FIG. 6 is a schematic, block diagram of the operating circuit of the present invention.

Referring to FIG. 1, an audio visual teaching device made in accordance with the concepts of the present invention is shown in FIG. 1 and generally designated by the reference numeral 10. The teaching device 10 includes a generally rectangular housing or cabinet 12 having a longitudinal slot 14 in the top thereof. The slot 14 provides a guideway or track for longitudinally transporting an information card 18, shown in phantom, past a playback/record transducing head 20 (FIG. 3) mounted within the slot 14. Typically, the information cards 18 are provided with both audio and visual information. The audio information is stored in a magnetic stripe on the card in the position to pass into engagement with the transducing head 20. Conventionally, the magnetic stripe includes two separate tracks, an instructor track and a student track for recording "model" pronunciations and a student's attempted duplication, respectively. The transducing head 20 may be vertically movable to read the separate tracks or may include two separate transducing portions in alignment with the respective tracks.

The cabinet 12 includes a front wall 22, side walls 24, and a rear wall 26 forming the rectangular lower housing thereof. A slightly canted deck or control panel 28 is mounted adjacent the front wall 22 and a pair of generally flat rear deck portions 30 and 32 define the slot 14. A storage cavity 34 is provided in the right rear corner and defined by the rear wall 26 and right side wall 24. The control panel includes a rocker type mode selector switch 38 which selects which of the tracks is going to be reproduced. The rocker switch 38 includes indicia designated "instructor" or "student" for listening to the respective track. As shown in FIG. 1, the student mode has been selected and the student can then record or play back information from the student track. In the instructor mode, it is desirable that the "model" information on the instructor track be retained, i.e., that there be a provision to prevent the student from erasing the "model" information. The teaching device 10 is normally in a playback mode and will record on the student track when a record button 40 on the control panel 28 is depressed. The recording function comprises both an erasure of existing material on the track and recording of new information.

Referring to FIG. 2, an auxiliary switch 44 is provided within the cavity 34 which will prevent, in one position, erasure of the "model" information on the instructor track. In its second position, the switch 44 permits erasure and recording of new material on the instructor track. An indicator lamp 42 signals that the "model" information can be erased. The control panel further includes a volume switch 46, a microphone 48, and a plurality of louvers 50 below which a playback speaker is mounted. In addition, the left side of the housing includes a head phone jack 52 and a mike jack 54. In addition to the record selector switch 44, a second transport drive speed switch 58 is mounted within the cavity 34 for connection to the control circuitry as shown in FIG. 6. The speed control switch 58 is a three-position switch wherein the three positions are designated at one end, "F", in its middle position "F/½" and in its opposite limit position as "½". These three positions correspond to various card transport modes. The first position "F" is a conventional full speed position which moves the information card 18 past the tapehead at a predetermined speed which is generally standardized throughout the industry so as to accept information cards manufactured and recorded at various sources. The opposite extreme position of the speed control switch 58 is a one-half speed position in which both the instructor track and the student track are moved past the transducer head 20 at a speed approximately one-half of the previously discussed full speed. This speed setting will require that the instructor track be recorded at the slower rate in order to provide intelligent audio information.

It has been found that the full speed transporting of the information card is often too fast for use in the student mode since some students, particularly those disadvantaged by a stammering handicap, do not have sufficient time to record an attempted response on the student track before the end of the card is reached. On the other hand, in the "½" position, the machine cannot utilize many existing preprogrammed cards which have been recorded at the full speed rate. Therefore, a combination position, or center position of the speed control switch 58 has been provided. The middle position designated "F/½" provides for transportation of the card past the transducer at full speed when the mode selector switch 38 is in the instructor position and half speed when the mode selector switch 38 is in the student position. The switch position then permits the use of existing, prerecorded information cards while providing the student with additional time in which to respond. A slidable cover plate 60 is mounted for movement to cover the switches 44 and 58, which may be preset by an instructor. The slide plate 60 includes a longitudinal slot 62 which slides on the shaft of a lock screw 64. A vertical tab 66 facilitates moving of the plate 60 between its two positions. Thus, an instructor can preset both switches 58 and 44 and prevent tampering by the students merely by locking the cover plate 60 in its extreme right position. The details with respect to the operation of the mode control switch 38 and speed control switch 58 will be discussed in more detail hereinafter with respect to FIG. 6.

The control panel 28 also includes a repeat actuator or switch 68 which provides a repeat function for the information card 18. In normal operations, referring to FIG. 1, the information card travels to the left as shown by arrow A during playback or recording. As shown, the card 18 is in an initial or starting position since the transducing head 20 is mounted below the triangular boss 70 indicating the starting position. After a complete cycle to the left, the student may simply remove the card from the slot 14 and insert a new card. More often, the student may wish to listen to either the "model" again or reproduce what he has recorded on the student track. To this end, the repeat switch automatically transports the card back to the initial position as shown in FIG. 1. The means for moving the card back to the initial position, generally designated 72, is shown in FIGS. 3–5. The information card 18 is held into engagement with the transducing head 20 and moved relative thereto by a capstan 74 which rotates in a clockwise direction (FIG. 4) in the forward mode. In addition to the transducing head 20, a small pinch roller 76 is mounted below the transducing head by a flexible spring 78 to maintain the card in engagement with the capstan. The repeat mechanism includes the repeat actuator 68 which is depressed to actuate a series of linkage, generally designated 80, which moves the transducing head to the right in FIG. 3, as shown by arrow B, away from and out of engagement with the card while reversing direction of rotation of the capstan 74. At this point, the pressure between the pinch roller 76 and the capstan 74 causes the information card 18 to be driven in the reverse direction. In addition to changing the rotational direction of the capstan, the repeat actuator 68 and linkage 80 serve to tilt the capstan as shown in FIG. 5. In the forward mode, as shown by the solid lines, the capstan 74 is tilted approximately 1° off of the vertical, to the left, to drive the information card 18 to the left and slightly downwardly to maintain engagement of the bottom edge of the card with the bottom surface 84 of the track 14. When the repeat button is depressed, the capstan 74 is pivoted in a clockwise direction as shown by arrow C, about the horizontal, through an angle of approximately 3°, to a reverse position, as shown in phantom, which is approximately 2° off of the vertical. This reverse cant therefore serves to maintain the bottom edge of the card in engagement with the track bottom 84. In order to prevent excessive wear in the track surface 84, wear resisting means is provided in the form of a pair of hardened and polished steel pins 88 mounted generally flush within the bottom surface 84 of the track on opposite sides of the capstan 74, as shown in FIG. 5.

Referring again to FIGS. 3 and 4, the transducing head 20 is mounted to a base plate 90 secured to a movable carriage 92. The carriage 92 is slidably mounted on a transverse wall 94 for movement in the direction shown by arrow D into and out of engagement with the information card 18 against the capstan. The movement of the carriage 92 is achieved by the link means 80 as described below.

The repeat actuator 68 is pivotally mounted by an axle 98 in a pair of upwardly directed ears 100 mounted on the transverse wall 94. The actuator 68 is generally rectangular and preferably integrally molded with a downwardly depending actuating pad 102 which is formed with a rear triangular rib 104 for added rigidity. The actuator 102 extends through a generally rectangular aperture 106 in the wall 94 and into engagement with a pivoted lever 107 The lever 107 is pivoted by an axle 108 secured within a similar pair of depending flanges by its reduced ends 110. The lever 107 includes a lower contact surface 112 which is engaged by the actuator 102 of the repeat switch 68 as it is depressed. The upper end of the lever 107 includes a notched or extending foot 114 which engages a horizontally slidable actuator plate 118. The actuator plate 118 is slidably mounted on the top of the wall 94 by a pair of longitudinal slots 120 and a shoulder pin 122 and bolt and washer combination 124. Thus, the actuator plate 118 can slide in the same direction as shown by arrow D. The pin 122 is secured to the transverse wall 94 and includes an upwardly extending post 126. A biasing spring 130 is secured between the post 126 and an upwardly extending T-flange 132 which may be formed from a rectangular aperture 134 in the actuator plate 118. The spring biases the plate in a direction toward the capstan and also biases the repeat button toward its up position. An upwardly extending tab 138 which may be formed from the slot 120 engages a laterally extending tab 140 on the transducer head carriage 92 so that, as the repeat button is depressed, the tab 138 moves the carriage rearwardly, toward the button 68. The limit of travel is determined by engagement of the tab 140 with the post 126. Thus, through this linkage 80, the transducer 20 is pulled away from the card to prevent unnecessary, and excessive wear to the tapehead.

The same movement of the actuator plate 118 is utilized to pivot the capstan through its 3° arc. More particularly, referring to FIGS. 4 and 5, the capstan 74 includes the tubular or rubber sleeve portion 150 on an upwardly directed shaft 152. The shaft 152 is rotatably mounted in a journal 156 secured within a generally rectangular mounting block 158. The mounting block 158 is pivotally mounted by a generally U-shaped frame 160 mounted to the underside of the wall 94. The two downwardly directed flanges thereof each include a threaded aperture through which a set screw 162 is inserted for engagement into the opposite ends of the mounting block 158. Typically, these could be threaded into the block 158 but are preferably mounted by pointed ends, thus reducing the amount of friction to the least amount possible. The set screws 162 are locked within the flanges by lock nuts 164. This mounting permits the block to rock as shown in FIG. 5 between the solid lines and the phantom lines. The shaft 152 extends downwardly through the block 158. Drive pulley 172 is mounted to shaft 152. The drive pulley 172 is substantially large and heavy and provides a flywheel, inertial effect to smooth out the rotation of the capstan 74. The pulley 172 is driven by a flexible belt 174 connected to a motor (not shown) which drives the pulley. Referring to FIG. 5, when the block 158 is tilted, the pulley 172 also tilts, and the flexible belt 174 flexes to accommodate the angular reorientation of the pulley.

The capstan 74 is tilted between the forward position, as shown in solid lines, to the reverse position, as shown in dotted lines, by actuation of the repeat actuator 68. Particularly, the actuator plate 118 includes a depending tab 178 which slides therewith in the direction of arrow D. The depending flange or tab 178 includes an angled slot 180 (FIG. 3) which encapsulates a laterally extending pin 182 secured to the side of the block 158. Thus, since the actuator plate 118 is maintained in engagement with the top of the transverse wall 94, movement of the depending flange rearwardly, relative to the pin 182, causes the pin to ride upwardly within the slot 180 thereby pivoting the block 158 in a clockwise direction, in FIG. 5.

This angular rotation of the mounting block 158 thereby pivots the capstan through its 3° arc of travel. Release of the repeat actuator 68 permits the spring biasing means 130 to return the actuator plate 118 to its forwardmost position rotating the block 158 in its opposite direction. In addition, a second biasing means 188 connected to a tab 190 on the opposite side of the block from the pin 182, urges the block in a counterclockwise rotational direction, until the tab 190 engages a stop flange 192 secured to the bracket 160. Thus, the rearward movement of the head 20 away from the card and the pivoting of the capstan 74 are achieved by a single operation of the repeat actuator 68.

In addition to the above-discussed control switches, a pair of card actuated limit switches (not shown) are mounted within the guideway 14 for engagement with the card 18 as it travels therethrough. Referring to FIG. 5, these switches comprise a forward limit switch 200 and a reverse limit switch 202. The forward limit switch 200 is mounted to the right of the capstan as viewed in FIGS. 4 and 5 while the reverse limit switch 202 is mounted to the left of the capstan as viewed in FIGS. 4 and 5. Therefore, in the position as shown in FIG. 1, the forward limit switch 200 is contacted by the card 18 enabling forward drive of the card, as will be discussed in greater detail hereinafter with respect to the schematic of FIG. 6. As the capstan 74 is energized, the card 18 moves to the left thus engaging the repeat limit switch 202 and continues until the card becomes disengaged from the forward limit switch 200, thus, shutting down the drive motor for the capstan. With the repeat switch 202 engaged, the repeat actuator 68 can enable the drive motor to drive the capstan 74 in the opposite direction until the card reaches its initial position 18, at which point the drive motor is again disabled in the rearward direction. Continued or maintained depression of the repeat actuator 68 maintains the motor de-energized, and, upon release thereof, through the forward limit switch 200, the card is automatically driven again in the forward direction.

More specifically, referring to the schematic block diagram of FIG. 6, the operation of the capstan drive motor 204 is controlled by several of the mechanical function switches previously described. The motor 204 is connected to a feedback tachometer 206 which through an integrator 208 provides a predetermined voltage proportional to the speed of the motor 204 on line 210 through a voltage divider comprising resistors 212 and a variable resistor 214 connected to ground. This predetermined voltage is applied to a servo-amplifier which forms part of a negative feedback loop and maintains the capstan motor 204 at a constant rate of rotation independently of the load. The servo-amplifier 220 is connected through a polarity reversal switch to the motor. The servo-amplifier 220 drives the motor in the forward direction only as will be described in detail hereinafter. The polarity reversal switch 224 is mechanically connected to the repeat actuator 68 and reverses the polarity of the current applied to the motor 204 when the repeat actuator is depressed. As previously discussed, the forward limit switch 200 and the repeat limit switch 202 also control the motor operation. As described above, the forward limit switch 200 enables the servo-amplifier 220 via line 226 when an information card 18 is in the position as shown in FIG. 1. The motor drives the card in the direction of arrow A until the forward limit switch opens, thus disabling the servo-amplifier 220 and shutting off the motor 204. At this position, the card 18 will be in engagement with the capstan and head adjacent its left end. Thus, the repeat limit switch 202 on the left of the capstan will be engaged by the card. The repeat limit switch 202 is connected to the polarity reversal switch 224 and provides maximum VDC thereto. The polarity reversal switch 224 is operated by the repeat actuator 68 and, in addition to the standard double-pole double-throw switch, includes a third double-throw switch which connects 20 VDC through the polarity reversal switch when the repeat actuator 68 is depressed to cause the polarity reversal. Thus, the motor 204 is driven in the opposite direction under maximum VDC. It can be seen that when the card 18 reaches its initial position as shown in FIG. 1, repeat limit switch 202 opens, thus again disabling the motor. As long as the repeat actuator is depressed, the card will remain in that initial position and will travel in the forward direction upon release of the repeat actuator.

The full speed and half speed of the motor 204 is controlled by the switch 58 as shown in the bottom of FIG. 6. The voltage divider of the resistor 212 and variable resistor 214 provide a predetermined input voltage to the servo-amplifier. When the speed control switch 58 is in the "F" position, a second variable resistor 230 is connected through the switch to ground in parallel with resistor 214. The parallel connection thus reduces the resistance to ground, thus reducing the voltage applied to the servo-amplifier which increases the drive to the motor 204. This higher speed is obtained irrespective of the position of the mode selector switch 38. The speed of the motor increases until the voltage on the line 210 is sufficiently increased to provide a new equilibrium point for the feedback loop at a higher speed of the motor. Conversely, when the speed selector switch 58 is in the half speed position, the resistor 230 is not in the circuit and causes more feedback voltage to be applied to the servo-amplifier which results in half speed operation in both the instructor mode and the student mode. In the middle position of the speed selector switch 58, the resistor 230 is connected to ground through the speed selector switch only when the mode selector 38 is in the instructor position. Thus, in the instructor position, the motor 204 is driven at the faster rate of speed. If the mode selector switch is moved to the student position, resistor 230 is again removed from the circuit and the motor operates at its slower speed. As described before, this is particularly advantageous since it enables use of existing cards programmed at the conventional, full speed, while simultaneously permitting the student to record and replay his recording at a substantially reduced rate of speed.

The foregoing detailed description has been given for clearness of understanding only and no unnecessary limitations should be understood therefrom as some modifications will be obvious to those skilled in the art.

What is claimed is:

1. A card transport mechanism for an audio visual device adapted to read an information card bearing a magnetic stripe, comprising:

a record/playback head for recording information on said magnetic stripe and for reproducing information from the magnetic stripe as said card is moved therepast in a first direction;

an amplifier connected to said record/playback head;

sound input means connected to said amplifier for receiving audible messages and recording said messages through said record/playback head on said magnetic stripe;

sound output means connected to said amplifier for audibly reproducing information through said record/playback head from said magnetic stripe;

card transport means including a rotatable capstan for engaging said card and maintaining the magnetic stripe on said card in engagement with said record/playback head when said card is moved thereby in said first direction;

record/playback head mounting means for movably mounting said head for movement into and out of engagement with said magnetic stripe;

selectively operable repeat switch means connected to said card moving means and said head mounting means for selectively moving said head out of engagement with said magnetic stripe and for reversing said card moving means to move said card in a second direction;

means mounting said capstan for pivotal movement between a first position for frictionally driving said information card in said first direction and a second position for frictionally driving said information card in said second direction; and link means connecting said capstan mounting means to said switch means for selective pivotal movement of said rotatable capstan between said first and second positions by actuation of said switch means, said link means including a movable, horizontal slide plate connected to said head mounting means and cam means on said link means for pivoting said capstan between said first and second position upon actuation of said repeat switch.

2. The device of claim 1 including means for biasing said capstan to said first position.

3. The device of claim 2 including means for biasing said head into engagement with said card.

4. The device of claim 1 including a U-shaped information card guide track and track wear resisting means on either side of said capstan for reducing the wear to the track.

5. The device of claim 4 wherein said wear resisting means comprises a pair of hardened and polished steel pins embedded in a generally flush relationship with the card engaging surface of said guide track.

* * * * *